(12) United States Patent
Nakamura et al.

(10) Patent No.: US 6,650,362 B1
(45) Date of Patent: Nov. 18, 2003

(54) MOVEMENT DETECTING APPARATUS WITH FEATURE POINT EXTRACTOR BASED ON LUMINANCE GRADIENT IN CURRENT FRAME

(75) Inventors: Yasuhisa Nakamura, Joyo (JP); Yoshihiro Kitamura, Osaka (JP); Hiroshi Akagi, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/269,033

(22) PCT Filed: Mar. 27, 1997

(86) PCT No.: PCT/JP97/01029
§ 371 (c)(1),
(2), (4) Date: Mar. 18, 1999

(87) PCT Pub. No.: WO98/12869
PCT Pub. Date: Mar. 26, 1998

(30) Foreign Application Priority Data

Sep. 20, 1996 (JP) ............................................. P8-249640

(51) Int. Cl.⁷ ............................ H04N 5/228; G06K 9/72
(52) U.S. Cl. ..................... 348/222.1; 382/229; 382/292
(58) Field of Search ................................. 348/154, 155, 348/169, 207.99, 208.99, 208.1, 208.4, 208.6, 208.12, 208.13, 208.14, 222.1; 382/291, 292, 298–301, 190, 229; H04N 5/232, 5/228

(56) References Cited

U.S. PATENT DOCUMENTS

| | | | | |
|---|---|---|---|---|
| 5,089,887 A | * | 2/1992 | Robert | 348/699 |
| 5,546,125 A | * | 8/1996 | Tomitaka | 348/169 |
| 5,737,447 A | * | 4/1998 | Bourdon | 382/236 |
| 5,835,641 A | * | 11/1998 | Sotoda | 382/291 |
| 6,144,405 A | * | 11/2000 | Toba | 348/208.4 |
| 6,266,085 B1 | * | 7/2001 | Kato et al. | 348/143 |

FOREIGN PATENT DOCUMENTS

| | | | | |
|---|---|---|---|---|
| JP | 5-7327 A | 1/1993 | | H04N/5/232 |
| JP | 5-219420 A | 8/1993 | | H04N/5/232 |
| JP | 6-86149 A | 3/1994 | | H04N/5/232 |
| JP | 7-95469 A | 4/1995 | | H04N/5/232 |

\* cited by examiner

*Primary Examiner*—Ngoc-Yen Vu
(74) *Attorney, Agent, or Firm*—Nixon & Vanderhye P.C.

(57) ABSTRACT

In connection with the detection of an amount of movement of an image such as a document image having a small gradient of brightness, it has been difficult to detect the amount by a representative point method, and a block matching method requires much time. An image (F1) at a time (T1), which has been imaged by moving an imaging section (1), is taken into a memory (2) and a feature point extracting section (3), where feature points of the image (F1) are extracted, and an image (F2) at a start time (T2) of the subsequent frame is taken in the memory (2) and the feature point extracting section (3). A correlation operating section (5) operates feature points of the image (F2) and the image (F1) in an area designated by a search area deciding section (4) to output an amount of movement.

9 Claims, 8 Drawing Sheets

IMAGE F1 TAKEN AT T1

IMAGE F2 TAKEN AT T2

IMAGE F3 TAKEN AT T3

REFERENCE SIDE    SEARCH SIDE

FIG.9

MATCHING PROCESS FOR SMALL AREA IN BLOCK MATCHING METHOD IS DIFFICULT

REFERENCE SIDE    SEARCH SIDE

MOVEMENT DETECTING APPARATUS WITH FEATURE POINT EXTRACTOR BASED ON LUMINANCE GRADIENT IN CURRENT FRAME

TECHNICAL FIELD

The present invention relates to a movement detecting apparatus for detecting an amount of movement of an image of a subject on an image forming surface by taking in images continuously by using an imaging apparatus such as a video camera. The detected amount of movement is used for correcting blur of the video camera caused by unintentional movement of the hands or for combining the taken-in images.

BACKGROUND ART

Figure 10:
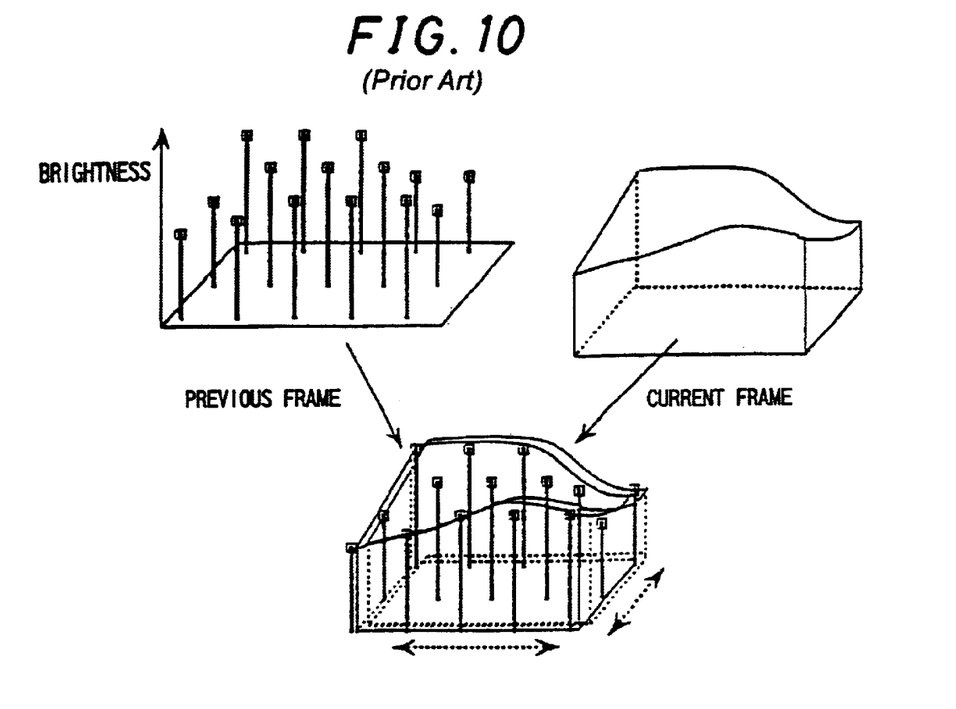
FIG. 10 is a conceptual drawing of the prior art representative point matching method.

Hitherto, a representative point method is used as means for observing an amount of movement from images taken in continuously. This method is used primarily to compensate movements such as blur of a video camera caused by unintentional movement of the hands. FIG. 10 is a conceptual drawing of the representative point method. It is a method in which representative points are set at fixed positions of an image of a previous frame with respect to images taken in continuously, a correlation operation and an accumulative addition operation are implemented for corresponding pixels while shifting in, two-dimensionally with respect to an image of a current frame and an amount of a shift in which values of the operations are highest is detected as an amount of movement.

It has been arranged so as to improve its accuracy by applying a Laplacian filter or the like on the set representative points to find gradient of luminance and to calculate by using that value as disclosed in Japanese Unexamined Patent Publication JP-A 6-86149.

Figure 11:
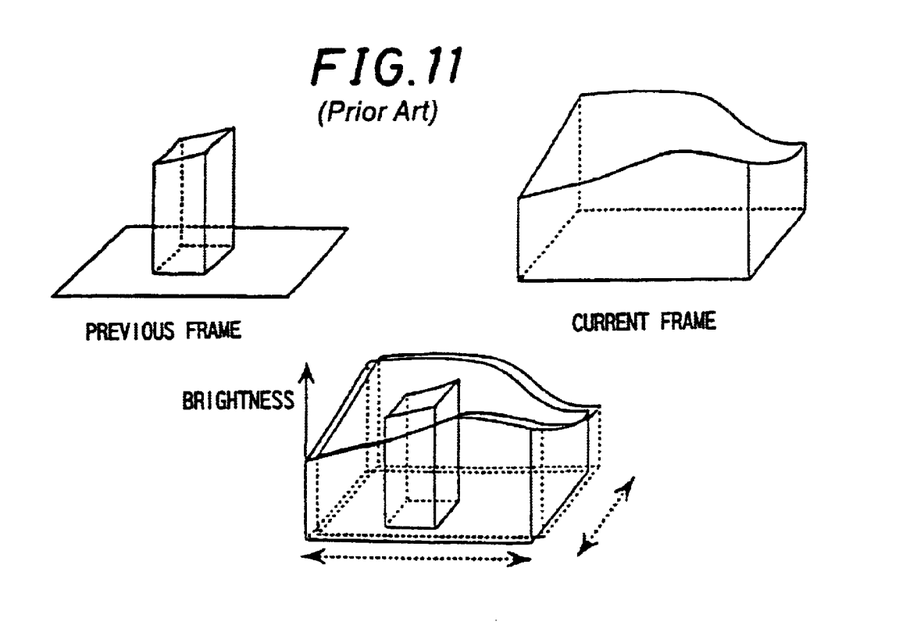
FIG. 11 is a conceptual drawing of the prior art block matching method.

It is also possible to detect an amount of movement by employing a block matching method of deciding positions to be combined by implementing correlation operation on parts where images overlap. FIG. 11 is a conceptual drawing of the block matching method. This is a method of setting a specific area to be referenced of an image of a previous frame and of implementing correlation operation while shifting in two-dimensional directions with respect to an image of a current frame to find an amount of movement in the same manner with the representative point method. However, while the representative point method requires to find the correlation of just several points to implement the cumulative addition, the block matching method requires to implement cumulative addition of the whole specific area, thus requiring higher speed processing.

However, in the above-mentioned representative point method, there must be certain luminance gradient always with respect to a certain representative point. For instance, when a subject is monochromatic data such as document, there has been a problem that an amount of movement cannot be detected properly because the luminance gradient is low at all representative points.

That is, although it is effective when the luminance gradient is uniformly distributed in an object image, it is difficult to detect an amount of movement in a document or the like abundant in a background for example because the part where the luminance gradient is low becomes the background.

Meanwhile, the block matching method has had a problem that it is difficult to detect an amount of movement on real-time because it takes large amounts of operations.

Accordingly, it is an object of the invention to provide a movement detecting apparatus which is capable of finding an amount of movement with good luminance and at high speed in an object image, e.g., a document image in which the luminance gradient is not uniform.

DISCLOSURE OF THE INVENTION

According to certain example embodiments of this invention, a movement detecting apparatus which detects an amount of movement by storing images inputted in time sequence, comprises feature point extracting means for extracting feature points of spots having a large change in brightness from an image of a current frame, search area deciding means for deciding a predetermined area of an image of a subsequent frame as a search area for correlation operation and correlation operation means for taking a correlation between the feature point and each pixel within the search area.

According to certain example embodiments, the movement detecting apparatus further comprises imaging means for inputting images in time sequence.

According to certain example embodiments, the search area deciding means decides the search area on the basis of an amount of movement obtained from an image of a previous frame and the image of the current frame.

According to certain example embodiments, the feature point extracting means extracts a feature point of a spot having a large change in brightness from a plurality of areas in the image of the current frame in which coordinates in one direction coincides with each other, the search area deciding means decides the search area for the correlation operation per area of an image of a subsequent frame and the correlation operation means implements the correlation operation per area.

BEST MODE FOR CARRYING OUT THE INVENTION

Figure 1:
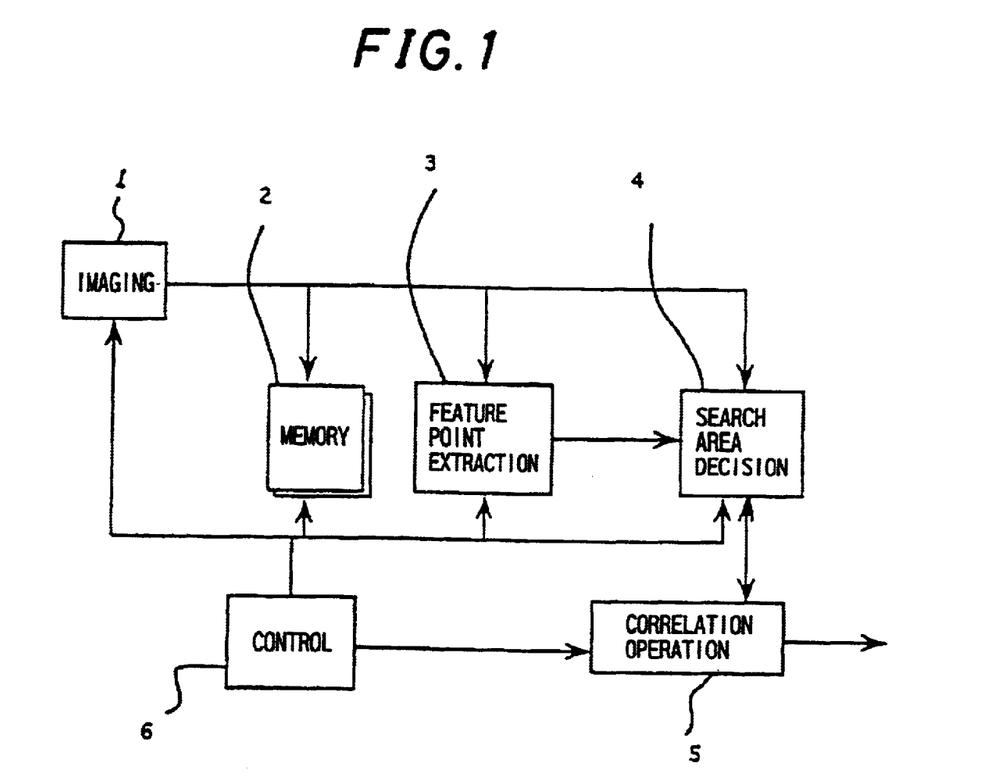
FIG. 1 is a block diagram of a movement detecting apparatus of the present invention.

An embodiment of the present invention will be explained below with reference to the drawings. FIG. 1 is a block diagram showing one embodiment of the invention. A movement detecting apparatus comprises an imaging section 1 composed of an optical system, a CCD or the like for taking images, a memory 2 for storing image data transferred from the imaging section 1, a feature point extracting section 3 for extracting points used in pixel operation, a search area deciding section 4 for deciding a search area for correlation operation, a correlation calculating section 5 for taking a correlation between pixels to output an amount of movement, and a control section 6 for controlling each section described above.

Figure 2:
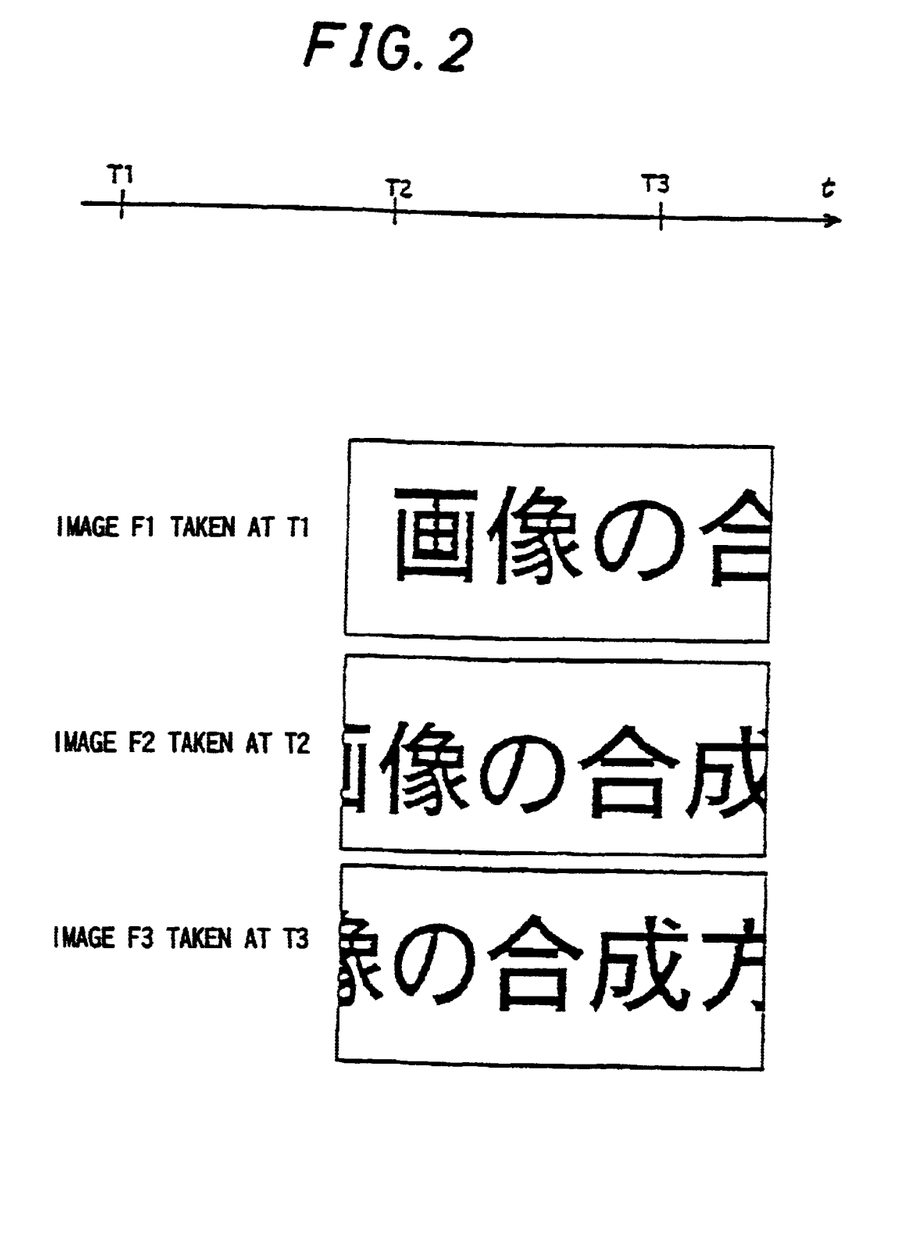
FIG. 2 is a drawing showing images continuously taken.

Here, a procedure in imaging a document on which black characters are written on a white background will be explained, by actually moving the imaging section 1 by the hands. FIG. 2 shows states of images on the way of being imaged continuously at certain time intervals. Reference numerals T1, T2, T3, . . . indicate times when images are started to be taken in and the images taken in at times T1, T2, T3, . . . will be denoted as F1, F2, F3, . . . , respectively. The image F1 is taken in from the imaging section 1 between the times T1 and T2, is stored in the memory 2 and is sent also to the feature point extracting section 3 in the same time to extract feature points of the image F1.

Next, the image F2 is taken in between the times T2 and T3, is stored in the memory 2 and is sent also to the feature point extracting section 3 in the same time to extract all feature points of the image F2. Further, between the times T2 and T3, the correlation calculating section 5 implements a correlation operation between all of the feature points of the image F1 extracted between the times T2 and T3 of the previous frame and all pixels in the vicinity of specific position within the image F2 corresponding to each of those feature points. It is noted that the specific position within the image F2 is corrected by an amount of movement found in the previous frame between the times T1 and T2. Hereinafter, the same process with that between the times T2 and T3 is repeated after the time T3 by setting the feature points of the current frame as a reference image and an area in the vicinity of the specific position of the subsequent frame as a search area.

Figure 3:
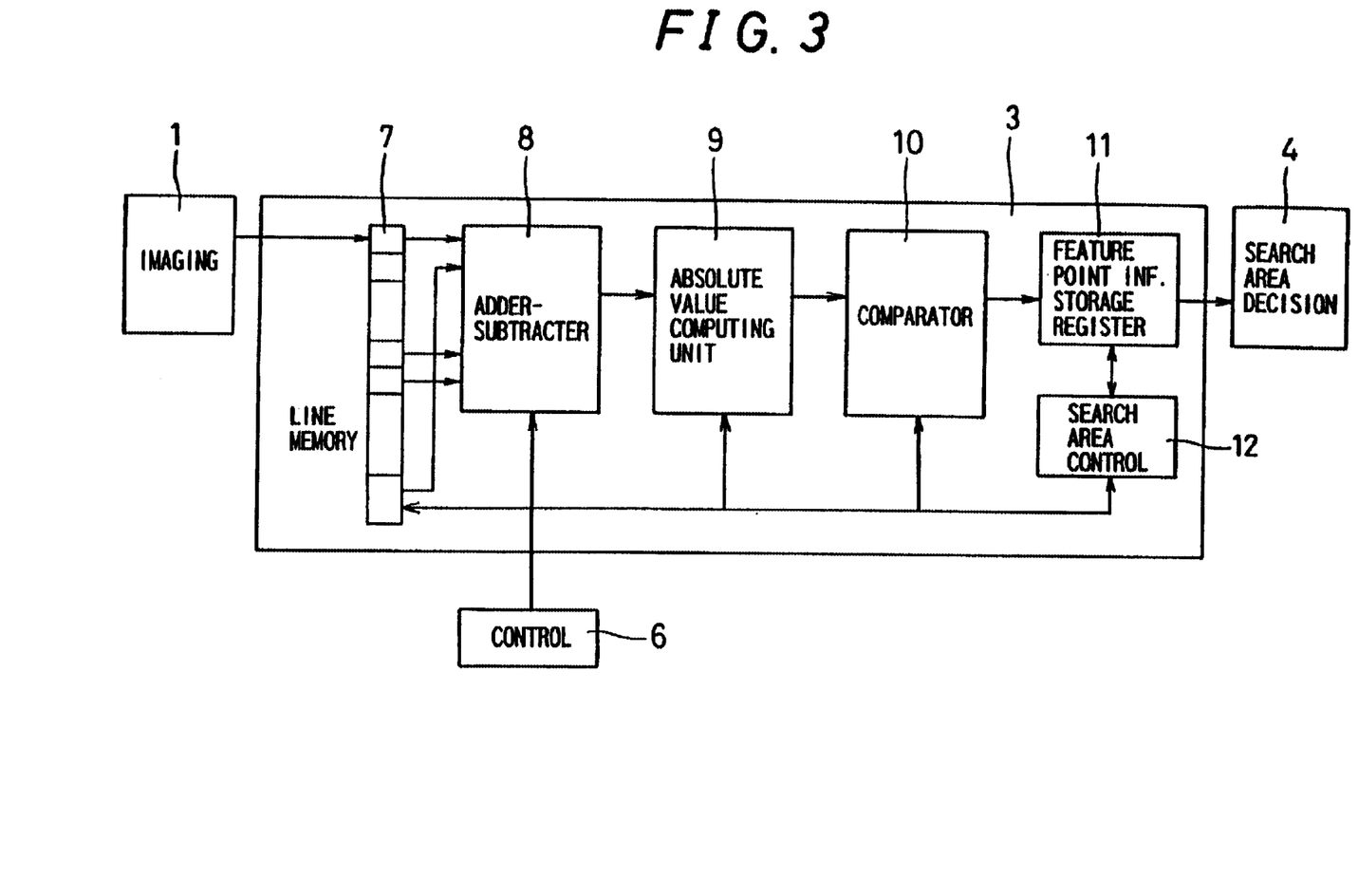
FIG. 3 is a block diagram of a feature point extracting section III.

Next, the feature point extracting operation will be explained. FIG. 3 shows the structure of the feature point extracting section 3. The feature point extracting section 3 comprises a line memory 7 for reading neighboring pixels concurrently, an adder-subtracter 8 for finding luminance gradient, an absolute value computing unit 9 for obtaining an absolute value of luminance, a comparator 10 for checking whether or not the luminance gradient exceeds a threshold value, a feature point information storage register 11 for storing the luminance of the found feature point and its coordinate values, and a search area control section 12 for controlling the search area.

Figure 4:
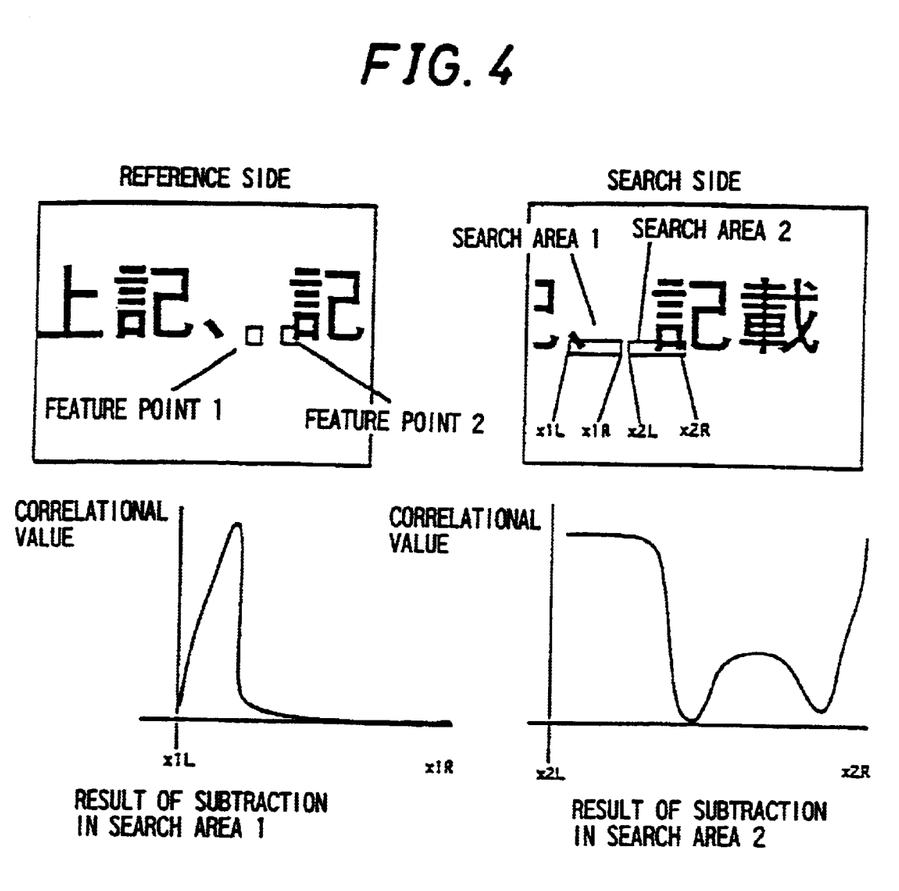
FIG. 4 is a drawing for explaining an advantage of selecting a spot where gradient of luminance is high.

Next, an advantage of selecting a feature point where luminance gradient is high will be explained by using FIG. 4. That the luminance gradient is high means that a difference of luminance between neighboring pixels is large and edge portions of a character correspond to that in a document image. An absolute value of the difference is used for the correlation operation.

When a feature point is set in a part having less luminance gradient, e.g., the background part, no difference is produced in a result of subtraction in a certain area because values of luminance of neighboring pixels are almost equal. Meanwhile, when a feature point is set in a part having a high luminance gradient, a difference is produced in a result of subtraction in a certain area because the values of neighboring pixels are different. In concrete, when a feature point 1 in FIG. 4 where there is less change in luminance is adopted and subtraction is carried out within a search area 1, the obtained result turns out as shown in a lower left graph. It is difficult to decide an amount of movement because the minimum values appear at most of the parts. Meanwhile, when a feature point 2 in FIG. 4 is adopted and subtraction is carried out within a search area 2, the obtained result turns out as shown in the lower right graph and an amount of movement may be narrowed down almost to two points. It indicates that the amount of movement may be narrowed down further by taking other feature points and by cumulatively adding the results of subtraction with the search areas per pixel of the search area.

The feature point extracting operation will be explained again by returning to FIG. 3. In the invention, whether or not to extract a feature point is determined by judging whether or not a luminance gradient exceeds a certain threshold value, i.e., an absolute values of a difference between neighboring pixels exceeds a certain threshold value. Then, when it exceeds the certain threshold value, the luminance and coordinate values of that feature point are transferred to the search area deciding section 4. In synchronism with the transfer of data from the imaging section 1 to the memory 2, data per pixel is taken into the line memory 7 in detecting the feature point. The line memory 7 has one line of buffers and composes a certain pixel and its upper and lower and right and left pixels concurrently to make reference from the adder-subtracter 8. Then, the adder-subtracter 8 finds a difference of values of the neighboring pixels, the absolute value computing unit 9 finds its absolute value and transfers it to the comparator 10. The comparator 10 judges whether it is higher than the threshold value and stores the luminance and coordinate values of the corresponding pixel and a feature point No. indicating the extracted order of that feature point in the feature point information storage register 11.

The search area control section 12 realizes that no new feature point is stored within the search area by the coordinate stored in the feature point information storage register 11. It may be realized by controlling such that the feature point on the reference side is solely decided with respect to the image on the search side. The control is made concretely by finding distances in x and y directions between the coordinate values of the feature point stored in the feature point information storage register 11 and coordinate values of the feature point to be found and by not setting that point as a feature point when the distances are less than certain values. It becomes possible to execute the extraction of the feature point in parallel with the operation for taking in images.

Figure 5:
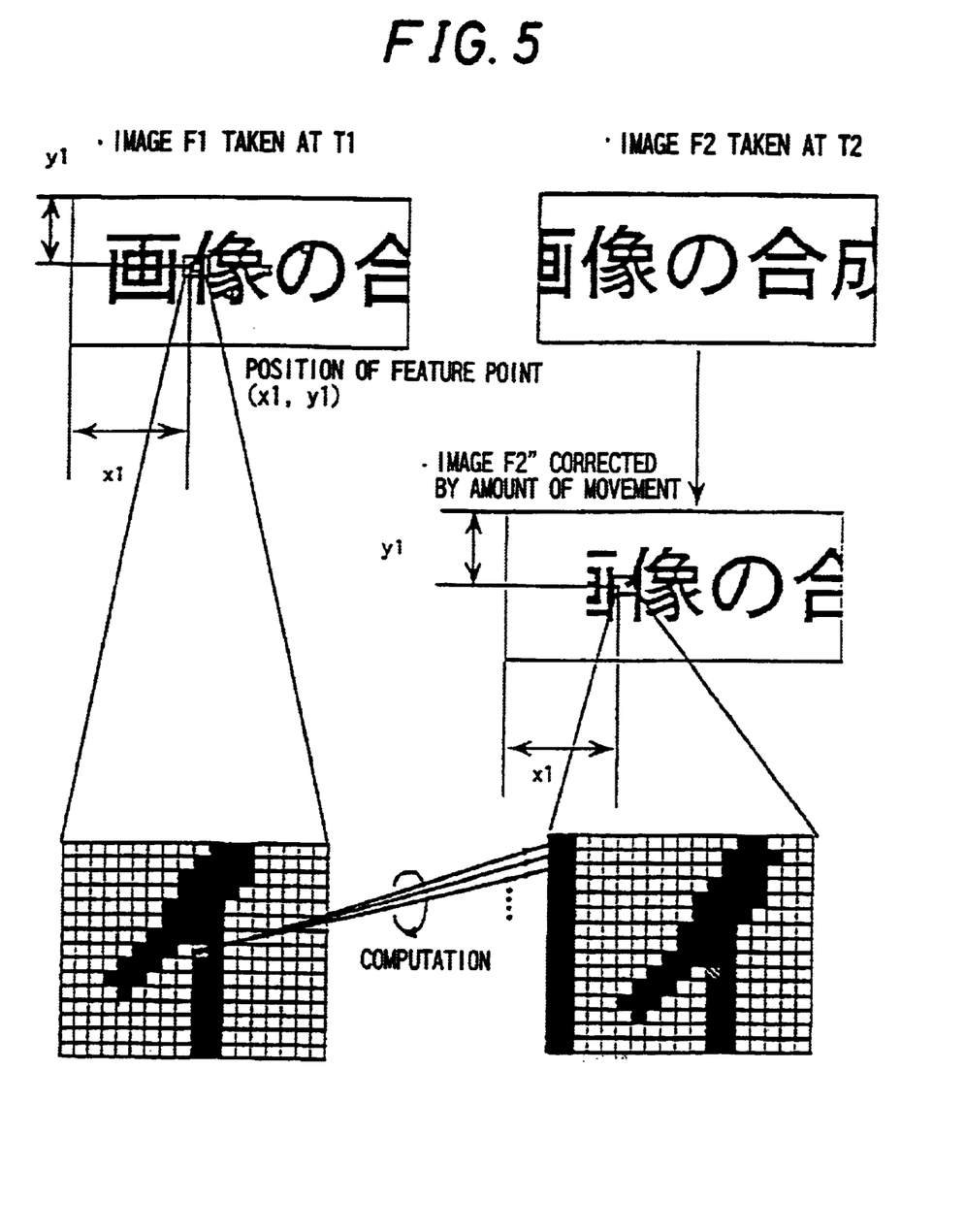
FIG. 5 is a drawing for explaining a procedure for deciding a search area for calculating a correlation.

Next, the operation for carrying out the correlation operation by deciding the search area for the correlation operation will be explained by using FIGS. 5 and 6. FIG. 5 is a drawing for explaining feature points found by the feature point extracting section 3 and the concept of the correlation operation. The upper left image is the image F1 taken at the time T1 and the upper right image is the image F2 taken at the time T2.

Figure 6:
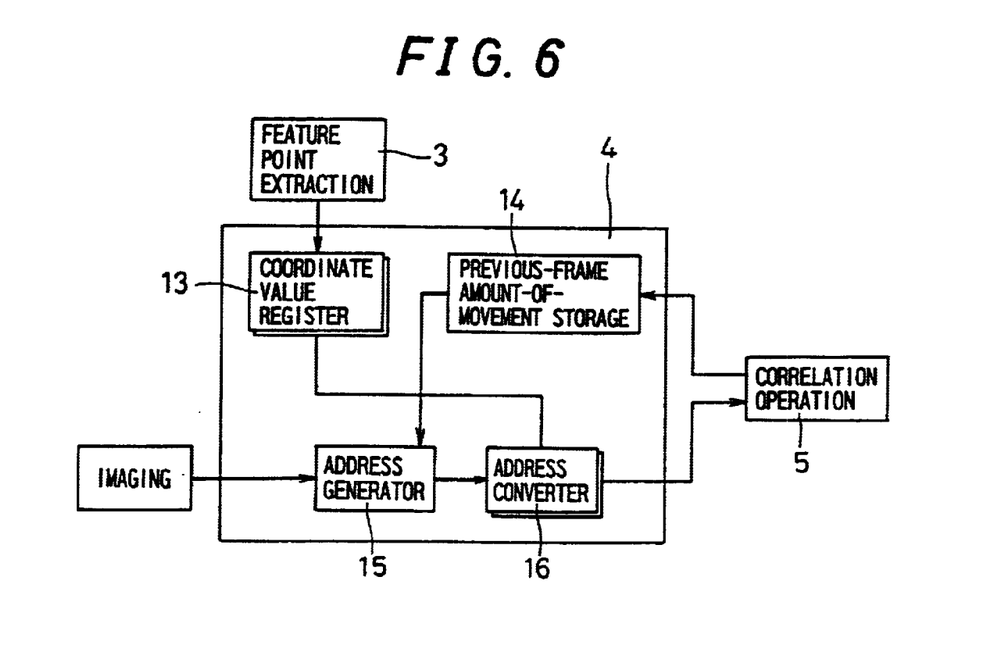
FIG. 6 is a block diagram of a search area deciding section 4.

FIG. 6 is a block diagram showing the search area deciding section 4. The search area deciding section 4 comprises a coordinate value register 13 for storing coordinates of a feature point transferred from the feature point extracting section 3, a previous-frame amount-of-movement storage section 14 for storing an amount of movement found by the correlation calculating section 5, an address generator 15 for generating coordinate values corrected by the amount of movement of the previous frame, and an address converter 16 for converting to an address whose original point is set at upper right part of a search area and to a feature point No. from values of the address generator 15 and the coordinate value register 13.

At first, all of the feature points of the image F1 are found between the times T1 and T2 and are stored in the coordinate value register 13 at the time T2. Next, in the same time with that the image F2 is sent from the imaging section 1 to the memory 2 and the feature points of the image F2 are found between the times T2 and T3, a corrected value of the amount of movement found in the previous frame in the address generator 15 is sent to the address converter 16. It is noted that the initial value of the amount of movement is set at 0 at the moment of time when the imaging is started. By having the same numbers of differential circuits and comparison circuits with the number of the feature points for example, the address converter 16 finds that a feature point is which feature point and its relative position within the search area and sends out in synchronism with the luminance of the appropriate address to the correlation calculating section 5. This will be explained by using FIG. 5 again. The feature point extracting section 3 decides a point which exists in a middle part of "亻" portion of Chinese character "像", as a feature point, and gives it to the coordinate value register 13. The address generator 15 coverts to an address in which the amount of movement is corrected. It corresponds to producing an image F2' in FIG. 5.

Thereby, when the amount of movement of the current frame is equal to the amount of movement of the previous frame, the same address with the feature point must be a corresponding point and it is preferable to search in the vicinity of the area corrected by the amount of movement of the previous frame to implement correlation operation. Then, the address converter 16 generates an image of M×N pixels centering on the same coordinate values with the coordinate values of the feature point. This corresponds to the lower right image in FIG. 5 and a result obtained by calculating the correlation between the luminance of the feature point of the image F1 and the luminance of M×N pixels of the image F2' taken in from the imaging section 1 is outputted. An image of M×N pixels is generated in the same manner for another feature point within the same frame to implement the correlation operation.

The correlation calculating section 5 will be explained further below. Assume that the correlation calculating section 5 finds (x, y) which satisfy the following expressions for example:

$$\min (F(x, y), 0 \leq x \leq M, 0 \leq y \leq N) \quad (1)$$

$$F(x, y) = \sum_{i=0}^{k} S(x, y)(i) - R(i) \quad (2)$$

where, k is a number of feature points, M is a search width of an amount of movement in the horizontal direction, N is a search width of an amount of movement in the vertical direction, S(x, y) (i) is a value of luminance of a pixel on the search side corresponding to the i-th feature point when an amount of movement is (x, y), and R(i) is a value of luminance of the feature point i.

When the amount of movement is (x, y), coordinates ($x_R$, $y_R$) of the feature point of the image F1 and coordinates ($x_T$, $Y_T$) of a pixel corresponding to the feature point of the image F2' has the following relationship:

$$x_T = x_R + x \quad (3)$$

$$y_T = y_R + y \quad (4)$$

Figure 7:
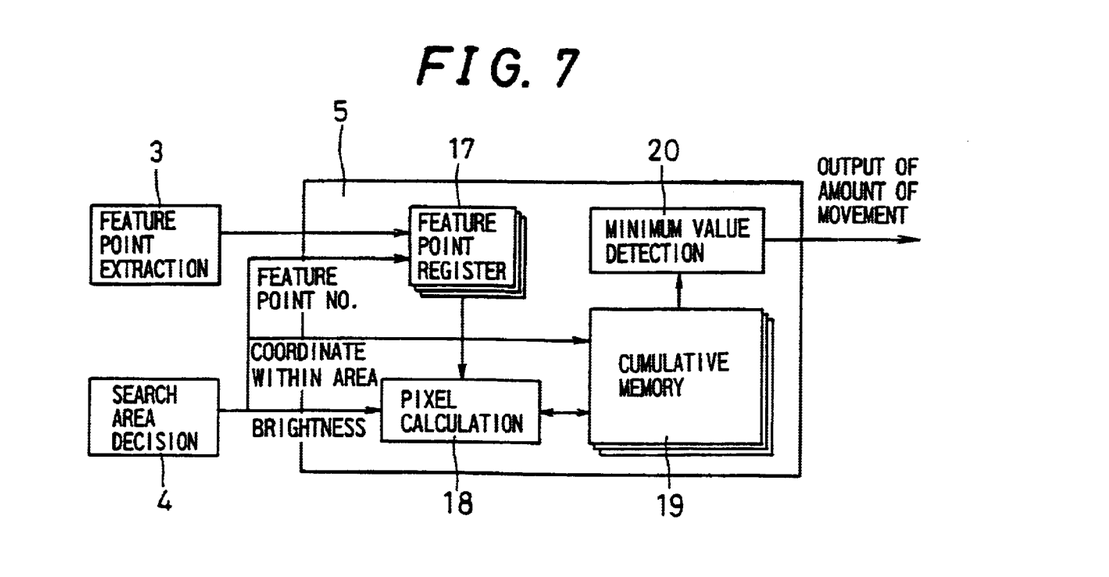
FIG. 7 is a block diagram of a correlation calculating section V.

Next, the movement detecting operation will be explained. FIG. 7 is a block diagram of the correlation calculating section 5. The correlation calculating section 5 comprises a feature point register 17 for storing values of luminance of the feature points found by the feature point extracting section 3, a pixel calculating section 18 for finding a correlation between pixels, a cumulative memory 19 for storing cumulative values, and a minimum value detecting section 20 for finding a minimum value.

A corresponding feature point in the feature point register 17 is selected by the feature point No. generated by the search area deciding section 4 and is sent to the pixel calculating section 18. In the same time, an appropriate location of the cumulative memory 19 is selected by the coordinate within the area. A value of luminance is given further and a value of correlation is found by operation of the difference and sum and is returned to the cumulative memory 19. When a process of one frame ends, the minimum value detecting section 20 selects a part where the value of correlation is least among the pixels M×N on the search side of the cumulative memory 19 and outputs it as an amount of movement. By constructing as described above, it becomes possible to detect the movement accurately on real-time.

Figure 8:
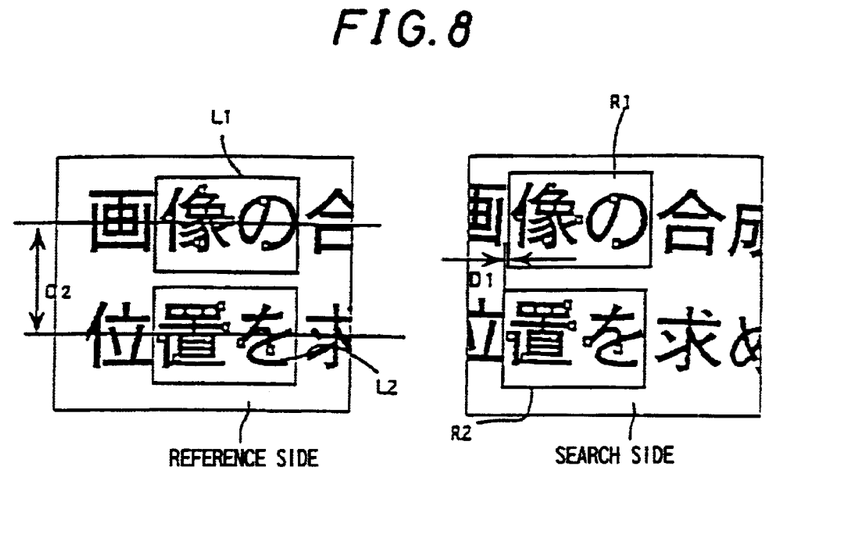
FIG. 8 is a drawing for explaining how an angular change is detected.

Because it is possible to set the search area arbitrarily in the invention, it is possible to find an angle by setting rectangular areas L1 and L2 of the reference side such that the X coordinates coincide as shown in FIG. 8 by slightly changing the location where the coordinate value within the area outputted by the search area deciding section 4 is generated, by deciding the feature point extracting sections and the search areas of the rectangular areas L1 and L2, respectively, and by implementing correlation operation per area to detect two amounts of movements. In concrete, an amount of feature is found from the rectangular areas L1 and L2, the correlation operation with the image on the search side is implemented and rectangular areas R1 and R2 coincident with the rectangular areas L1 and L2 are found as shown in FIG. 8. Next, the relative position D1 of the rectangular areas R1 and R2 is found and a distance D2 between the center coordinates of the rectangular areas L1 and L2 is found. An angle to be corrected is detected from the D1 and D2 by employing trigonometric function.

Next, an operation time according to the invention will be explained while comparing with the prior art block matching method.

In the feature point method, the time necessary for detecting the feature point is proportional to the area of a reference image. Further, the time necessary for the correlation operation is proportional to the size of the search area and the number of feature points. When the size of the reference image is 320×240 pixels, the number of feature points to be extracted is 25 and the search area is 20×20 pixels, the time required for the operation turns out to be 78,000×α+10,000×β. Here, β is an amount of operation per pixel in finding the luminance gradient and β is an amount of operation per pixel in finding the correlation of pixels.

Meanwhile, when the block matching method is used, it turns out to be 20×20×320×240β=30,720,000β. When α and β are assumed to be almost the same amount of operation, the time required for the operation of the feature point method is 88,000β and the block matching method requires large amounts of operations of more than 300 times of the feature point method.

Figure 9:
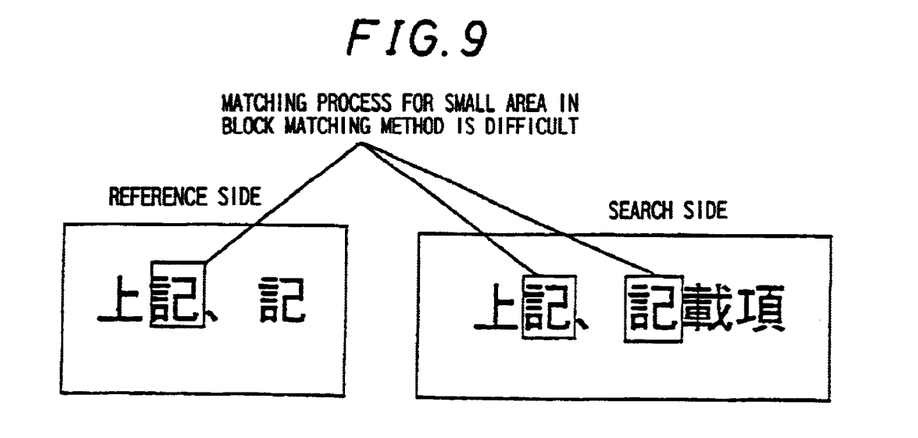
FIG. 9 is a drawing for explaining a problem of the block matching method.

Further, although the amount of operations may be equalized even by the block matching method by suppressing the reference area to about 25 by observing the change in luminance, it becomes difficult to match and an amount of movement cannot be decided when the same characters are adjoining closely to each other on the search side as shown in FIG. 9, thus remarkably deteriorating the result.

INDUSTRIAL APPLICABILITY

As described above, because the invention allows the correlation operation to be implemented by setting an arbitrary spot as a feature point even when luminance gradient does not exist uniformly on an image plane, it is possible to detect an amount of movement at an arbitrary point of the image by selecting a plurality of points where the luminance gradient is high with respect to an adjoining pixel even in a document whose background is totally white and the invention is also better than the representative point method in terms of accuracy.

Further, as compared to the block matching method, the amount of operations is reduced by about two digits and it is possible to implement real-time processing in the frame rate.

What is claimed is:

1. A movement detecting apparatus which detects an amount of movement by storing document images inputted in time sequence, comprising:

feature point extracting means for extracting feature points of spots having a large change in brightness from a document image of a current frame, the feature point extracting means determining whether to extract a feature point from the document image of the current frame based on at least whether a luminance gradient, associated with the feature point and based upon a plurality of neighboring pixels in the current frame, exceeds a threshold value, so that feature points having respective large changes in brightness relative to neighboring pixels resulting in said threshold value being exceeded are extracted and thus selected for use in a correlation process by a correlation operation means, but feature points not having respective large changes in brightness relative to neighboring pixels and thus not exceeding the threshold value are not extracted for use in the correlation process by the correlation operation means;

search area deciding means for deciding a predetermined area of a document image of a subsequent frame as a search area for correlation operation; and the correlation operation means for taking a correlation between an extracted feature point that was extracted by the extracting means and each pixel within the search area.

2. The movement detecting apparatus of claim 1, further comprising imaging means for inputting images in time sequence.

3. The movement detecting apparatus of claim 1, wherein the search area deciding means decides the search area on the basis of an amount of movement obtained from an image of a previous frame and the image of the current frame.

4. The movement detecting apparatus of claim 1, wherein the feature point extracting means extracts a feature point of a spot having a large change in brightness from a plurality of areas in the image of the current frame in which coordinates in one direction coincides with each other, the search area deciding means decides the search area for the correlation operation per area of an image of a subsequent frame and the correlation operation means implements the correlation operation per area.

5. The apparatus of claim 1, wherein the feature point extracting means comprises a line memory for reading neighboring pixels concurrently from the current frame, and an adder-subtracter for determining the luminance gradient associated with the feature point based on the neighboring pixels from the current frame.

6. A movement detecting apparatus which detects an amount of movement by storing document images inputted in time sequence, the apparatus comprising:

a feature point extractor for extracting a feature point having a change in brightness from a document image of a current frame, wherein the feature point extractor determines whether to extract the feature point from the document image of the current frame based on at least whether a luminance gradient associated with the feature point and based upon a plurality of neighboring pixels in the current frame exceeds a threshold value, so that feature points having respective large changes in brightness relative to neighboring pixels resulting in said threshold value being exceeded are extracted and thus selected for use in a correlation process by a correlation device, but feature points not having respective large changes in brightness relative to neighboring pixels and thus not exceeding the threshold value are not extracted for use in the correlation process by the correlation device;

a search area deciding device for deciding a predetermined area of a document image of a subsequent frame as a search area for a correlation operation; and a correlation device for taking a correlation between a feature point extracted by the feature point extractor and each pixel within the search area.

7. The apparatus of claim 6, wherein the feature point extractor comprises a line memory for reading neighboring pixels concurrently from the current frame, and an adder-subtracter for determining the luminance gradient associated with the feature point based on the neighboring pixels from the current frame.

8. The apparatus of claim 7, wherein the feature point extractor further comprises an absolute value computing unit whose output is received by a comparator that determines whether the luminance gradient exceeds the threshold value.

9. The apparatus of claim 6, wherein the search area deciding device decides the search area on the basis of an amount of movement obtained from an image of a previous frame and the image of the current frame.

\* \* \* \* \*